US006699390B1

(12) United States Patent
Griffin et al.

(10) Patent No.: US 6,699,390 B1
(45) Date of Patent: Mar. 2, 2004

(54) USE OF BEESWAX TO DEGRADE HYDROCARBONS

(75) Inventors: William M. Griffin, Cranberry Township, PA (US); Bradford A. Waldron, Pittsburgh, PA (US)

(73) Assignee: Petrol Rem. Incorporated, Pittsburgh, PA (US)

( * ) Notice: Subject to any disclaimer, the term of this patent is extended or adjusted under 35 U.S.C. 154(b) by 0 days.

(21) Appl. No.: 09/919,138

(22) Filed: Jul. 31, 2001

(51) Int. Cl.[7] .................................................. C02F 3/00
(52) U.S. Cl. ...................... 210/608; 210/610; 210/747; 210/922; 435/262.5; 435/281
(58) Field of Search ................................ 210/610, 608, 210/747, 922, 170; 435/262, 262.5, 264, 281

(56) References Cited

U.S. PATENT DOCUMENTS

| 3,732,162 A | * | 5/1973 | McCoy ...................... 210/922 |
| 3,959,127 A | * | 5/1976 | Bartha et al. ............... 210/922 |
| 5,112,495 A | * | 5/1992 | Bartha et al. ............... 210/922 |
| 5,348,803 A | * | 9/1994 | Schlaemus et al. ......... 435/281 |
| 5,395,535 A | * | 3/1995 | Pinckard ..................... 210/922 |
| 5,807,724 A | * | 9/1998 | Resnick ...................... 435/281 |
| 6,398,960 B1 | * | 6/2002 | Borden et al. .............. 210/747 |

OTHER PUBLICATIONS

"Processing Beeswax" by Birdaree Bee Supplies Aug. 1999.*

* cited by examiner

Primary Examiner—Christopher Upton

(57) ABSTRACT

A method of remediation of petroleum hydrocarbons on water which includes contacting the petroleum hydrocarbons with a source of natural beeswax which over a predetermined time period results in the remediation of the hydrocarbons through the action of indigenous microorganisms contained in the water. A floating porous device which contains the beeswax may be employed, with the beeswax being in the form of hollow shells.

21 Claims, 1 Drawing Sheet

USE OF BEESWAX TO DEGRADE HYDROCARBONS

FIELD OF THE INVENTION

This invention relates generally to remediation of chemical and petrochemical spills, and more specifically to the remediation of petroleum hydrocarbons on water.

BACKGROUND OF THE INVENTION

One of EPA's primary efforts over the past several years is to identify and implement methods that reduce nonpoint source discharges to the waters of the United States. Reduction of nonpoint source discharges requires both the voluntary efforts of an educated citizenry and the technology capable of facilitating the change. One major and increasing area of nonpoint source discharge is the area of recreational boating. EPA has requested marina operators and boaters to implement best management practices with bilge oil and fueling activities, but currently, they do not have suitable technologies to achieve compliance with these goals.

In an effort to address this problem, U.S. Pat. No. 5,807,724 teaches a method degrading petroleum hydrocarbons with organisms which are encapsulated in wax. More specifically, organisms that degrade hydrocarbon-based substances are encapsulated in wax to form organism-containing hollow wax spheres that are used for removing oil-based substances such as oil spills on land and water. The organism is preferably of the genus Candida that produce lipase. The spheres may contain nutrients that sustain the organism. The wax is paraffin wax or beeswax, and the sphere may be coated with talc or carbon powder to provide insulation and to prevent one sphere from sticking to another. When used for remediating an oil spill on water, the spheres may be contained in a container or broadcast in a loose form.

An essential feature of the '724 patent is to provide microorganism which are contained within the wax spheres. This system therefore requires processing and control to assure that viable microorganisms are available for degrading hydrocarbons in use. Because of complexity and cost of this system it has been largely ineffective in the remediation of hydrocarbon spills on water.

SUMMARY OF THE INVENTION

It is therefore an object of the present invention to provide a remediation system which overcomes the problems of the prior art described above.

It is another object of the present invention to provide a remediation system which economically and effectively degrades petroleum hydrocarbons on water.

It is yet another object of the present invention to provide a remediation device which effectively degrades petroleum hydrocarbons through the action of indigenous microorganisms.

It is a further object of the present invention to provide a system for degrading hydrocarbons which natural beeswax is used as the key operative component.

It is yet another object of the present invention to provide a remediation system for use in the bilge of a boat which utilizes natural beeswax as the operative component.

The present invention is based upon the discovery that natural beeswax as the active ingredient in a bioremedation device enhances the natural degradation of hydrocarbons such as diesel fuel through the action of indigenous microorganisms contained in the water being treated. The natural beeswax is available commercially through distributors and is usually sold in 15 to 25 pound slabs. In addition, it has been discovered that bacteria in similar devices seemed to have no impact on the natural biodegradation rate and can be safely removed or eliminated from this product which provides for both process and economical advantages. It has been shown that the beeswax can maintain a high population of hydrocarbon degraders for a relatively long period of time.

There are at least about 200 known inedgenous genera of bacteria capable of biodegrading hydrocarbons by the process of the present invention. Typical genera include Pseudomonas, Bacillus, Aspirigillas, and Arthrobacter. The following article identifies additional bacteria which function to biodegrade hydrocarbons by the process of the present invention and is incorporated herein by reference. Zobell, C. E. 1973. Microbial degradation of oil; present status, problems and perspectives. P.3–15. In: D. G. Ahearn and S. P. Meyers (eds.) The microbial degradation of oil polutants. Center for Wetlands resources, LSU Pub. No. LSU-SG-73-0).

In one embodiment the device takes the form of a porous cylinder or bag which does not absorb oil, but allows oil to permeate through the sidewalls and contact the beeswax contained within. The beeswax is a natural form of beeswax in the form of hollow spheres which binds with the hydrocarbons. In another embodiment, the device may take the form of a boom which may be formed to surround and treat a localized oil spill. In another form, the spheres may be used as a loose product, not contained in a bag, sprayed onto the spill.

BRIEF DESCRIPTION OF THE DRAWING

For a further understanding of these and objects of the invention, reference will be made to the following detailed description of the invention which is to be read in connection with the accompanying drawing, wherein.

DETAILED DESCRIPTION OF THE INVENTION

In the present invention the microspheres are made by conventional technology known to the art. The following devices are suitable for use but the spheres can also be made by any other conventional methods. Suitable hardware includes the Komfeld Rotary Reactor, a device developed by NASA (see NASA Tech Briefs. MFS-28214. Entitled Rotary Reactor Makes Large Latex Particles); or through utilization of other encapsulating devices or processes; such as the Vanderhoff rotary Reactor (also a NASA technology), by microshell manufacturers e.g., KMS Industries of Ann Arbor, Mich., or Picro-Pak, Inc. of N.Y.; Insulated Technologies Corp. of Philadelphia, Pa. The microspheres have a diameter between about 0.20 and 1,000 micrometers.

The spheres may also be made by the methods set forth in U.S. Pat. No. 5,807,724 which is incorporated herein by reference.

Figure 1:
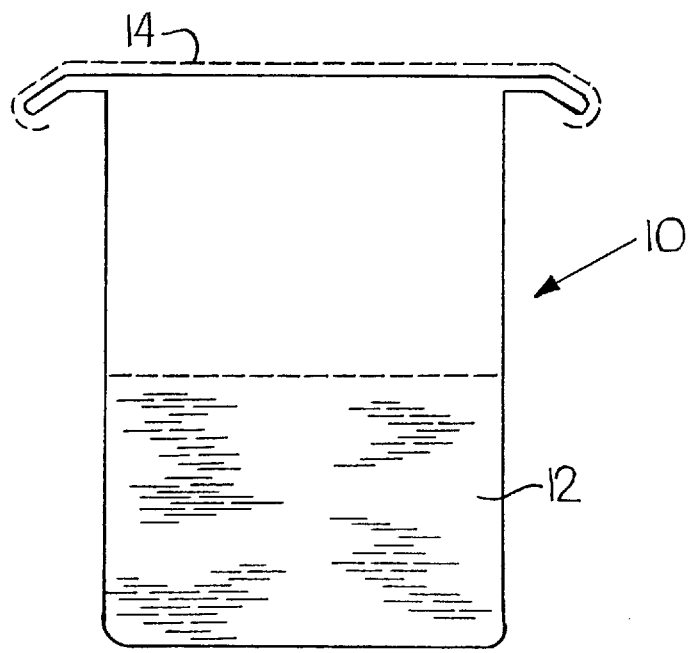
FIG. 1 is a schematic side view of a bilge model reactor (BMR) which is used to illustrate the invention.

In order to demonstrate the present invention a simulated bilge model reactor (BMR) is illustrated in FIG. 1 of the drawings in the form of a beaker 10. In this case a 400 ml beaker was used.

A series of tests were run to evaluate the performance the natural population (Natural BioD), the Beeswax formulation with added microorganisms (Beeswax with microbes) and Beeswax without added microorganisms (Beeswax without microbes). The beeswax with the microbes (bacteria) used Pseudomonas or Bacillus in concentrations of about $5\times10^6$ microbes per 200 pounds of beeswax.

Water was sampled from Point State Park in Pittsburgh, Pa. on the day of the test. The water (200 ml) was immediately transferred to the laboratory and dispensed into the BMR's. To the reactors, 200 mg of fresh diesel was added. BMR's containing Beeswax products were given 1 gram of beeswax material to each beaker. The diesel fuel floats on top of the water 12 and the beeswax combines or sticks to the diesel oil (not shown). At this point time 0, samples were sacrificed for analysis. At the end of 2 weeks and 4 weeks BMR's were sacrificed for analysis. The BMR's were gently shaken for the appropriate time on a rotary shaker—the rate was below the calibration of the shake table but gently moved the liquid on the glass but did not cause any losses through the opening in the BMR's. All BMR's (beakers) had covers 14 (shown in phantom) that prevented contamination of the experiment, but air could readily enter the reactor.

Table 1 shows the results of the standard chemical analysis for Diesel Range Organics (DRO) for the BMR studies. Samples were taken over a 4 week period and DRO results are presented as gg diesel/BMR. Each treatment was preformed in triplicate at each time point. As can be seen all treatments resulted in the DRO reduction. The experimental average reduction for all treatments grouped together was 77%. The Beeswax without microbes treatment performed slightlybetter having a reduction of 84% compared to 71% and 77% for the Natural BioD and Beeswax with microbes, respectively. Statistical analysis using a 2 way analysis of variance (ANOVA) indicated that the decreases in DRO over time was significant for P=0.1. The statistical results are shown in Appendix 1.

TABLE 1

DRO results for product formulation evaluation

|  | 1 | 2 | 3 | Avg |
|---|---|---|---|---|
| Time 0 |  |  |  |  |
| Natural BioD | 142 | 151 | 145 | 146 |
| Beeswax without microbes | 145 | 127 | 166 | 146 |
| Beeswax with microbes | 113 | 112 | 106 | 110 |
| Time 2 weeks |  |  |  |  |
| Natural BioD | 76 | 84 | 67 | 76 |
| Beeswax without microbes | 64 | 76 | 115 | 85 |
| Beeswax with microbes | 60 | 50 | 74 | 61 |
| Time 4 weeks |  |  |  |  |
| Natural BioD | 51 | 40 | 35 | 42 |
| Beeswax without microbes | 29 | 15 | 28 | 24 |
| Beeswax with microbes | 31 | 25 | 21 | 26 |

The differences between treatments were not shown to be significant. However, the 2-way ANOVA groups all data sets to evaluate overall variability. To more accurately evaluate difference between individual treatments a student's T-test was run to compare the Natural BioD vs. Beeswax without microbes, Natural BioD vs. Beeswax with microbes and Beeswax with microbes vs. Beeswax without microbes. The results of the analysis are given in Appendix 2. The analysis indicates the amount of reduction in the Beeswax with microbes and Beeswax without microbes were significantly different from the Natural BioDat the 90% confidence interval. There were no significant differences between the Beeswax with microbes and Beeswax without microbes.

The overall decline in DRO could be the result of physical/chemical loss. The use of ratios of biodegradable to non-biodegradable markers is commonly used in demonstrate the loss is due to biodegradation. The most common method is the ratio of the alkane C-17 to the isoprenoid pristane and C-18 to phytane. These data are present in Table 2. As can be seen in all cases the highly degradable alkanes decreased in relationship to the highly branched and recalcitrant isoprenoids. These data are indicative of biodegradation where more readily degradable components are metabolized in preference to less degradable materials. If the loss was physical no change in these ratios would be expected.

TABLE 2

Marker Analysis for BMR studies

|  | 1 | 2 | 3 | Avg |
|---|---|---|---|---|
| Time 0 |  |  |  |  |
| Beeswax with microbes |  |  |  |  |
| C17/Pristane | 1.27 | 1.29 | 1.32 | 1.29 |
| C18/Phytane | 2.34 | 2.34 | 2.26 | 2.31 |
| Natural BioD |  |  |  |  |
| C17/Pristane | 1.24 | 1.29 | 1.27 | 1.27 |
| C18/Phytane | 2.25 | 2.31 | 2.28 | 2.28 |
| Beeswax without microbes |  |  |  |  |
| C17/Pristane | 1.21 | 1.30 | 1.34 | 1.28 |
| C18/Phytane | 2.40 | 2.38 | 2.48 | 2.42 |
| Time 2 |  |  |  |  |
| Beeswax with microbes |  |  |  |  |
| C17/Pristane | 1.24 | 1.16 | 1.25 | 1.22 |
| C18/Phytane | 2.3 | 1.94 | 2.14 | 2.14 |
| Natural BioD |  |  |  |  |
| C17/Pristane | 1.09 | 1.04 | 1.69 | 1.27 |
| C18/Phytane | 1.77 | 2.00 | 1.98 | 1.92 |
| Beeswax without microbes |  |  |  |  |
| C17/Pristane | 1.23 | 1.16 | 1.33 | 1.24 |
| C18/Phytane | 2.12 | 2.26 | 2.28 | 2.22 |
| Time 3 |  |  |  |  |
| Beeswax with microbes |  |  |  |  |
| C17/Pristane | 0.83 | 0.76 | 0.54 | 0.71 |
| C18/Phytane | 1.65 | 1.78 | 1.67 | 1.70 |
| Natural BioD |  |  |  |  |
| C17/Pristane | 0.63 | 0.44 | 0.10 | 0.39 |
| C18/Phytane | 1.84 | 1.75 | 0.99 | 1.53 |
| Beeswax without bugs |  |  |  |  |
| C17/Pristane | 0.66 | 0.08 | 1.06 | 0.60 |
| C18/Phytane | 1.61 | 0.87 | 1.63 | 1.37 |

Bacterial numbers were followed during the course of the tests. These data are presented in Table 3. The bacterial numbers (both heterotrophic and hydrocarbon degraders) increased over time. The high levels of microorganisms at time 0 indicated that there were a significant number of microorganisms present in the river water at the time of sampling. The level hydrocarbon degraders increased as a percentage of the population over the course of the experiments. At the end of the tests, however, treatments containing Beeswax showed higher numbers of organisms (both heterotrophic and hydrocarbon degrader). Considering that the DRO numbers suggest that the majority of the diesel has been degraded and the bacterial numbers in the Natural BioD had fallen off to level found in the original water, the presence of the Beeswax may be providing a continued nutrient source to sustain the population. This fact has a couple of positive implications: (1) the Beeswax is being degraded, an integral part of the BioSok's application and it is maintaining a very high hydrocarbon degrading population to respond to the next release of oil into the bilge.

TABLE 3

Bacterial Numbers from BMR Studies

Heterotrophic Bacteria Counts (organisms/mL)

| Time 0 | 1 | 2 | 3 | Avg |
|---|---|---|---|---|
| Natural BioD | 2.4E+06 | 2.1E+07 | 8.2E+05 | 8.1E+06 |
| Beeswax without microbes | 1.5E+04 | 6.1E+07 | 1.0E+07 | 2.4E+07 |
| Beeswax with microbes | 3.2E+06 | 1.8E+06 | 1.5E+05 | 1.7E+06 |

| Time 2 | 1 | 2 | 3 | Avg |
|---|---|---|---|---|
| Natural BioD | OOR | 2.1E+06 | 2.0E+05 | 1.2E+06 |
| Beeswax without microbes | 3.0E+05 | 4.5E+05 | IR | 3.7E+05 |
| Beeswax with microbes | 2.8E+04 | 1.3E+05 | 4.5E+05 | 2.0E+05 |

| Time 4 | 1 | 2 | 3 | Avg |
|---|---|---|---|---|
| Natural BioD | 5.1E+04 | 1.5E+04 | 7.2E+03 | 2.4E+04 |
| Beeswax without microbes | 2.4E+07 | 1.7E+07 | 9.3E+08 | 3.2E+08 |
| Beeswax with microbes | 2.3E+08 | 1.9E+07 | 2.5E+08 | 1.6E+08 |

Hydrocarbon Bacterial Counts (organisms/mL)

| Time 0 | 1 | 2 | 3 | Avg |
|---|---|---|---|---|
| Natural BioD | 2.1E+06 | 2.4E+06 | 4.7E+04 | 1.5E+06 |
| Beeswax without microbes | 4.5E+02 | 6.3E+04 | 2.1E+06 | 7.2E+05 |
| Beeswax with microbes | 9.3E+04 | 4.0E+05 | 2.1E+05 | 2.3E+05 |

| Time 2 | 1 | 2 | 3 | Avg |
|---|---|---|---|---|
| Natural BioD | IR | IR | IR |  |
| Beeswax without microbes | 1.9E+05 | 1.3E+06 | 7.1E+06 | 2.9E+06 |
| Beeswax with microbes | 1.1E+05 | 1.3E+05 | 8.2E+03 | 8.2E+04 |

| Time 4 | 1 | 2 | 3 | Avg |
|---|---|---|---|---|
| Natural BioD | 2.0E+07 | 2.4E+07 | 9.3E+07 | 4.6E+07 |
| Beeswax without microbes | 1.6E+06 | 2.4E+06 | 1.4E+09 | 4.6E+08 |
| Beeswax with microbes | 2.9E+08 | 4.5E+05 | OOR | 1.4E+08 |

OOR—denotes-out of range
IR—denotes-improbable result

The overall conclusion from this data is that Beeswax (the active ingredient in the BioSok) does enhance the natural degradation of the diesel in the BMR system. In addition, the added bacteria place in the current BioSok appears to have no impact on the natural biodegradation rate and can be safely removed from the product. Finally, the Beeswax can maintain a high population of hydrocarbon degraders for a long period of time.

To summarize, the product described herein can be simply used by spraying the product as a loose powder (the beeswax spheres) on a hydrocarbon spill. In this mode the powder floats on top of the water and bonds with oil immediately to prevent the pollution from sinking. When the powder becomes saturated with oil, it is left in place and the oil is degraded by indigenous microorganisms contained in the water. Following this, the beeswax then degrades itself through the actions of the microorganisms.

Figure 2:
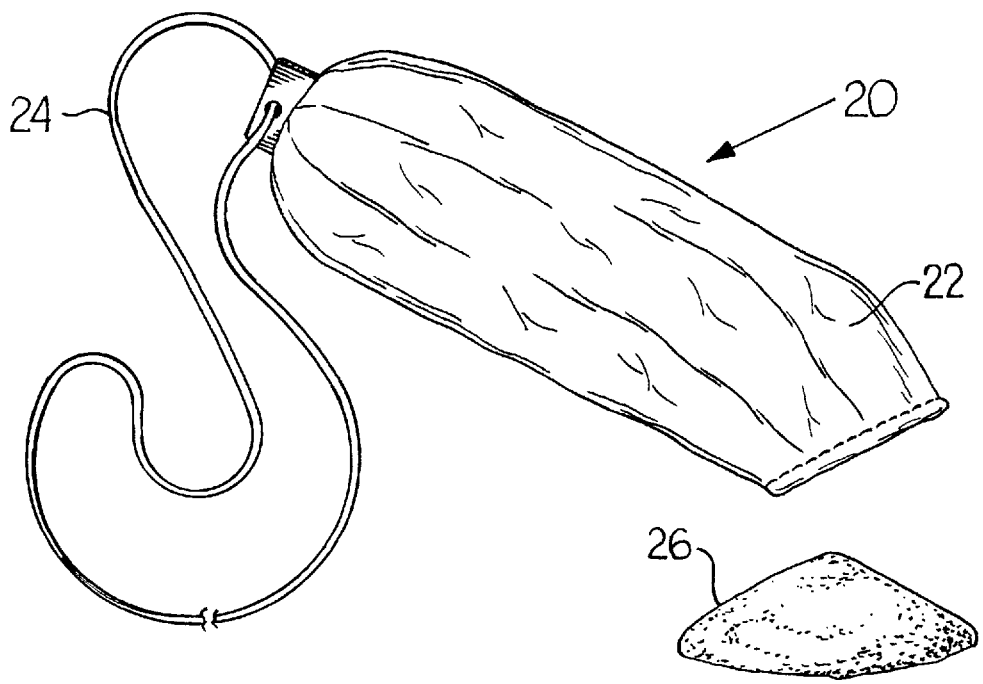
FIG. 2 is a perspective view of a device of the present invention which is suitable for use in the bilge of a boat.

For bilge cleaning, a porous cylindrically shaped sock about three inches in diameter and ten inches long is used to keep the bilge of a boat free of oil, odor and fumes so that only oil free water is pumped overboard. The sock is made of a non oil absorbing material such as a porous weave polyethylene and contains about 8 ounces of the beeswax spheres (powder). When this sock comes in contact with oil, it immediately absorbs up to one pound of contaminant, and degrades much more oil over time, and can last the entire boating season. The mechanism of operation is the same as that described above for the loose powder. FIG. 2 of the drawing illustrates the sock 20 having an outer porous fabric 22 and a tether cord 24 attached at one end. A sample of the loose beeswax spheres (powder) 26 is also shown.

In another use of the product, hollow elongated booms 2½ inches in diameter and 10 feet long can be jointed together to confine and treat small oil spills. The booms are made of a porous plastic which is non absorbing to oil and which are filled with the beeswax spheres (powder).

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of remediation of a petroleum hydrocarbons on water which consists essentially of contacting said petroleum hydrocarbon with a source of particulate natural beeswax which over a predetermined time period results in the remediation of said petroleum hydrocarbon through the action of indigenous microorganisms contained in said water.

2. The method of claim 1 in which the natural beeswax is in the form of hollow spheres.

3. The method of claim 2 in which the beeswax is contained in a porous outer container.

4. The method of claim 1 in which the beeswax is contained in a porous cylindrical container in an amount weighing about one pound.

5. The method of claim 1 which is carried out in the bilge of a boat.

6. A method of remediation of petroleum hydrocarbons on water which consists essentially of contacting said petroleum hydrocarbon with a source of particulate natural beeswax which over a predetermined time period results in the remediation of said petroleum hydrocarbon through the action of indigenous microorganisms contained in said water, wherein said beeswax is confined in a porous sealed container which is nonabsorbent to hydrocarbons.

7. The method of claim 6 in which the natural beeswax is in the form of hollow spheres.

8. The method of claim 6 in which the beeswax is present in an amount weighing about one pound.

9. The method of claim 6 which is carried out in the bilge of a boat.

10. A method of remediation of petroleum hydrocarbons on water which consists essentially of:
   (a) providing a porous container made of a material which is nonabsorbing to petroleum hydrocarbons with said container housing a source of natural beeswax;
   (b) contacting said container with a source of petroleum hydrocarbons on water whereby said hydrocarbons come in contact with and are fixed and immobilized by said beeswax which enables the remediation of said hydrocarbons through the action of indigenous microorganisms contained in said water.

11. The method of claim 10 in which the natural beeswax is in the form of hollow spheres.

12. The method of claim 10 in which the container is in the form of a plastic cylinder.

13. The method of claim 12 in which the beeswax is present in an amount weighing about one pound.

14. The method of claim 10 which is carried out in the bilge of a boat.

15. A method of remediation of petroleum hydrocarbons on water which consists essentially of:
(a) providing a plurality of porous containers made of a material which is non absorbing to petroleum hydrocarbons, said container being in the shape of an elongated boom with said container housing a source of natural beeswax;
(b) connecting said booms to confine a source of petroleum hydrocarbons on water whereby said hydrocarbons come in contact with and are fixed and immobilized by said beeswax contained within said booms which enables the remediation of said hydrocarbons through the action of indigenous microorganisms contained in said water.

16. The method of claim 15 in which the natural beeswax is in the form of hollow shells or spheres.

17. The method of claim 15 in which the boom is in the form of an elongated plastic member.

18. A method of remediation of petroleum hydrocarbons which consists essentially of contacting said petroleum hydrocarbons with a source of natural beeswax which over a predetermined time period results in the remediation of said petroleum hydrocarbon through the action of indigenous microorganisms which are present at the source of treatment.

19. The method of claim 18 in which the natural beeswax is in the form of hollow shells or spheres.

20. The method of claim 18 in which the beeswax is seeded in the area containing the petroleum hydrocarbon.

21. The method of claim 18 which is carried out in the bilge of a boat.

* * * * *

UNITED STATES PATENT AND TRADEMARK OFFICE
CERTIFICATE OF CORRECTION

PATENT NO.    : 6,699,390 B1
DATED         : March 2, 2004
INVENTOR(S)   : William M. Griffin et al.

It is certified that error appears in the above-identified patent and that said Letters Patent is hereby corrected as shown below:

<u>Column 6,</u>
Line 31, "a petroleum hydrocarbons" should read: -- a petroleum hydrocarbon --

Signed and Sealed this

Twenty-fourth Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,699,390 B1
DATED : March 2, 2004
INVENTOR(S) : William M. Griffin et al.

It is certified that error appears in the above-identified patent and that said Letters Patent is hereby corrected as shown below:

<u>Title page,</u>
Item [73], Assignee, "Petrol Rem Incorporated" should read:
-- Universal Remediation Co., Pittsburgh, PA (US) --

Signed and Sealed this

Eighth Day of March, 2005

JON W. DUDAS
*Director of the United States Patent and Trademark Office*